Oct. 3, 1967   G. W. PALMER   3,344,759
WORKHOLDERS FOR USE IN APPARATUS FOR GUIDING
A WORKHOLDER RELATIVE TO A TOOL
Filed March 1, 1965   9 Sheets-Sheet 5

INVENTOR
George Wilham Palmer
BY
ATTORNEY

Oct. 3, 1967  G. W. PALMER  3,344,759
WORKHOLDERS FOR USE IN APPARATUS FOR GUIDING
A WORKHOLDER RELATIVE TO A TOOL
Filed March 1, 1965  9 Sheets-Sheet 8

INVENTOR
George Wilham Palmer
BY
ATTORNEY

United States Patent Office 3,344,759
Patented Oct. 3, 1967

3,344,759
WORKHOLDERS FOR USE IN APPARATUS FOR GUIDING A WORKHOLDER RELATIVE TO A TOOL
George William Palmer, London, England, assignor to Light's London Limited, London, England, a British company
Filed Mar. 1, 1965, Ser. No. 435,848
4 Claims. (Cl. 112—2)

ABSTRACT OF THE DISCLOSURE

The workholder comprises upper and lower plates between which plies of fabric to be sewed together are confined, having registering slots through which the needle of a sewing machine can project. The slots define the line of stitching. Upstanding switch actuating means on the upper plate cooperate with switches on the machine to enable the sewing machine to be so operated that appreciable changes in the direction of sewing can be negotiated.

---

This invention relates to a workholder for use with apparatus for guiding a workholder relative to a tool.

According to the present invention, a workholder for use with apparatus for guiding a workholder in a plane relative to a tool comprises a flat sheet for engaging work on which the tool is to operate, a predetermined path formed in the sheet in which, during operation, the tool engages and between which and the tool relative movement takes place during operation, and means provided on the sheet and disposed parallel with a section of the predetermined path, the said means cooperating, during operation, with electrical circuit actuating means on the apparatus to effect relative movement between the workholder and the tool in a particular direction in a sense reverse to that obtaining when said circuit actuating means on the apparatus are not actuated by the said means on the sheet. The means on the sheet may be elongated means extending parallel with the section of the predetermined path.

Suitably, the elongated means comprise a strip element provided on the side of the flat sheet opposite that which engages the work and projecting above the plane of the sheet.

The elongated means may comprise a plurality of strip elements extending parallel with respective sections of the predetermined path.

Preferably, the predetermined path is a slot formed in the sheet.

In one form of the invention the workholder is a stitching template for use in stitching together plies of fabric and to this end comprises upper and lower flat sheets between which the fabric plies can be engaged and each formed with a slot constituting the predetermined stitching path, the said slots being in register when the sheets are superposed and the upper sheet having thereon at least one upwardly projecting elongated strip element extending parallel with a section of the predetermined path.

The invention will now be described by way of example with reference to the accompanying drawings, in which.

Throughout the drawings like parts are designated with the same reference numerals.

Referring to FIGURES 1 to 12 apparatus for guiding a workholder relative to a plurality of tools is employed for guiding a stitching template relative to the needles of two sewing machines the stitching template being utilised to stitch together fabric plies of a shirt collar. The sewing machines include head castings 2 and 4 mounted on top of a table 6 and extending in a direction from front to rear of the table whilst above the table top is mounted an induction motor 8 the shaft 10 of which, otherwise called herein the first shaft, extends in a direction from side to side of the table and normal to needle drive shafts 12 and 14 within head castings, the needle drive shafts being otherwise herein referred to as the second shafts.

The drive from each of the second shafts to the associated needle for vertical reciprocation of the latter is largely of conventional known form and includes a collar (not shown) on the head casting in which a vertical post, which at its lower end carries a needle 16, is mounted for vertical reciprocation by means of a link and crank of known form, the crank being keyed to the forward end of the second shaft. A presser foot 18 is arranged for movement parallel with the direction of movement of the sewing needle 16. To this end the presser foot is carried on a vertical rod 20 which is slidable in spaced collars in the head casting. Vertical movement of the presser foot of each sewing machine is effected by means of a solenoid 22 on the head casting of the machine, the plunger of the solenoid effecting movement of the presser foot on energisation and deenergisation of the solenoid through the agency of a bowden cable 24.

There is fixed on each presser foot rod 20 a helical spring (not shown) which biasses the presser foot rod downwardly. Thus, upon de-energisation of the solenoids 22 the helical springs effect downward movement of the presser foot.

A driving wheel in the form of a pulley 24 is keyed to the first shaft and co-operates by means of an endless belt 26 with a driven pulley 28 mounted on a third shaft 30 which is parallel with the first shaft and which near opposite ends thereof has keyed to it respective bevel gears 32, the latter being in mesh each with a bevel gear 34 on one of the second or needle drive shafts 12, 14.

The bevel gears 32 and 34 near each end of the third shaft and the end of the adjoining second shaft are contained in a gear box 36. The driven pulley 28 is freely rotatably mounted by means of a ball race 38 on the third shaft 30. On one face of the driven pulley is secured, as by screws 40 to rotate with the driven pulley, a plate 42 of an electromagnetic clutch 44.

Figures 3, 10:
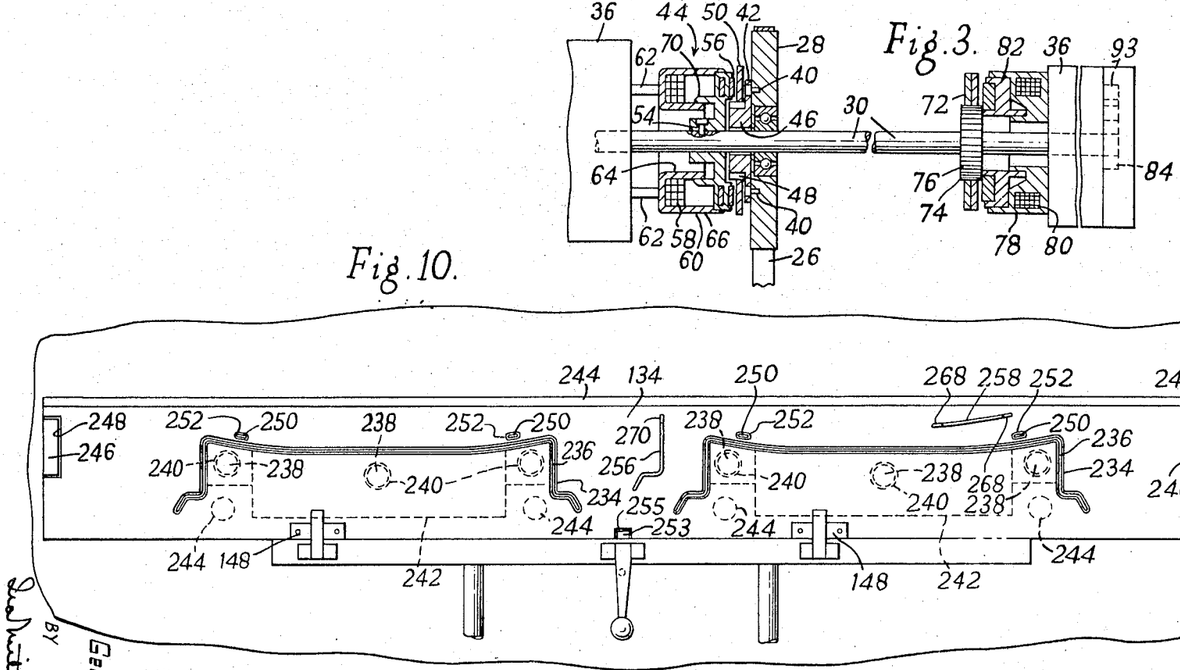
FIGURE 3 is a sectional view showing the construction of the clutch and brake mechanisms.
FIGURE 10 is a plan view of the stitching template.

The plate 42 is formed with a projecting central boss 46 the outer surface of which is formed with splines 48 extending longitudinally of the third shaft 30. Complementarily engaged on these splines is a driven plate member 50 of the clutch provided on its face remote from the driven pulley with a suitable friction lining. The plate member can thus move axially relative to the driven pulley 28 but is rotatable with that pulley. Opposed and adjacent to the driven plate member 50, the clutch includes a driving plate member 52 which is secured to the third shaft as by a grub screw 54 and which has a suitabe friction lining 56 on its face opposed to the driven plate member. On the side of the driving plate member remote from the driven plate member is an energising clutch coil 58 which is disposed in a housing 60 arranged concentrically with the shaft 30 and carried by supports 62 on the adjacent gear box 36.

The clutch housing includes inner and outer cylindrical walls 64 and 66 concentric with the shaft 30 and closed at rear ends thereof by radial wall 68 which is secured by the supports 62 to the adjacent gear box 36. At the forward ends of the inner and outer cylindrical walls, the periphery of the driving plate member is closely embraced by the forward end of the outer cylindrical wall 66 whilst a rearwardly projecting annular wall 70 of the driving plate member closely overlies the forward end of the inner cylindrical wall 64. Thus the annular gap between the inner and outer cylindrical walls is substantially closed by the driving plate member 52. On rotation of the motor shaft 10 the pulley 28 is driven and the driving plate member 42 rotates therewith and when the clutch coil 58 is energised the driven plate member 50 is magnetically attracted to the driving plate member 52 and moves into contact therewith along the splines 48 on the central boss of the plate 42 secured to the pulley 28. In this way the plate member 52 causes the shaft 30 to rotate with the motor shaft 10 and therefore to drive the sewing needles 16.

On the third shaft 30 spaced from the driven pulley 28 is mounted a brake plate 72 which is keyed to the third shaft so as to be capable of limited axial movement relative thereto. To this end on the third shaft 30 is secured a boss 74 formed on its outer surface with axially extending splines 76 with which the brake plate co-operates. On the side of the brake plate remote from the driven pulley is provided an annular brake housing 78 disposed concentrically with the third shaft 30 and secured to the adjacent gear box 36 carried on the head casting 4 of the relevant sewing machine. Within the brake housing is provided a brake energising coil 80 which, when energised, magnetises a front plate 82 of the housing adjacent the brake plate 72 causing the latter to be attracted axially to the housing and thereby stopping the shaft 30. The facing surfaces of the housing front plate 82 and brake plate 72 respectively are suitably friction lined.

On an end of the third shaft projecting beyond the relevant bevel gear box 36 is a cam 84 which is secured to the shaft for rotation therewith. For co-operating with the cam there is provided a microswitch 90 having a pivotally mounted movable member 92 carrying a cam follower roller 93 at one end thereof. The member carrying the cam follower is spring biassed by a spring loaded stud 94 attached to one of the microswitch contacts into contact with the cam. The pivotally mounted movable member is further connected at the end thereof remote from the cam follower roller 93 to a movable plunger 95 of a solenoid 96 carried on the adjacent bevel gear box casing. Energisation of the solenoid 96 causes the follower 93 on the movable member of the microswitch to be driven out of engagement with the cam on the end of the second shaft.

Figure 4:
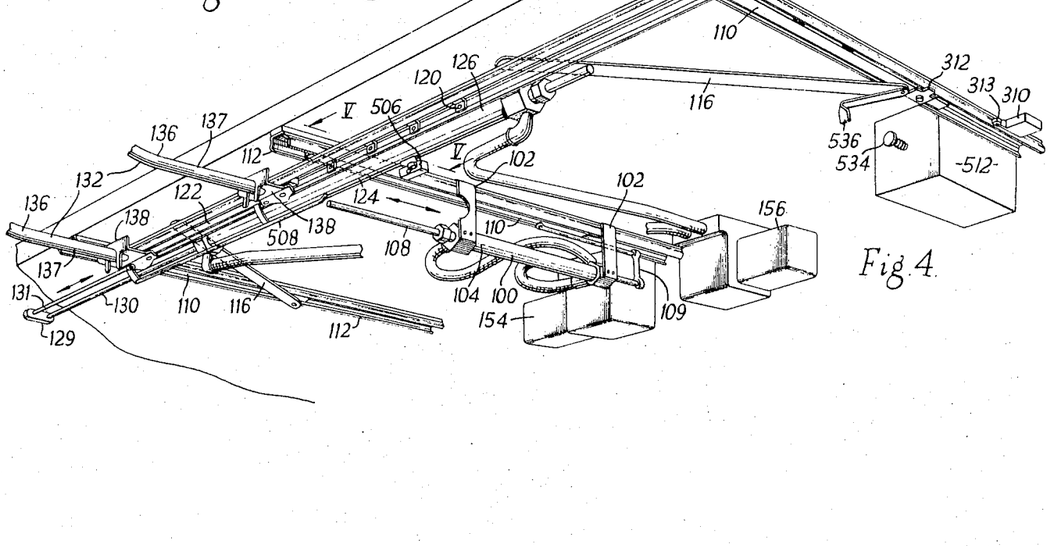
FIGURE 4 is a perspective view taken from beneath the table of the machine of the other figures.
Figure 5:
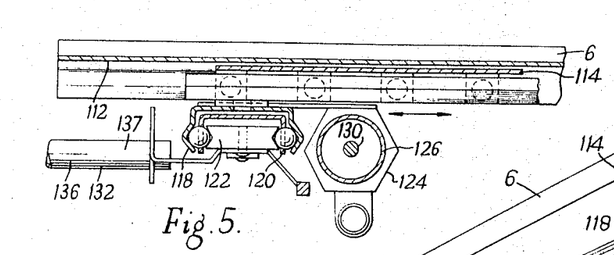
FIGURE 5 is a view taken on the line V—V of FIGURE 4.

Mounted on the underside of the table of the machine is the apparatus for guiding the stitching template relative to the tools i.e. the presser feet 18 and sewing needles 16. This apparatus includes a first ram 100 which is secured to the table 6 by brackets 102 and which comprises a double acting hydraulic cylinder 104 having a piston 106 carried on a rod 108 which extends throughout and projects from opposite ends of the cylinder 104. The piston rod is parallel and adjacent and connected by member 159 with a central one of three spaced parallel slide members 110 each mounted for longitudinal movement in a ball guide which suitably consists of a piece of sliding door angle iron 112 secured to the table and having a ball bearing cage 114 mounted therein, the slide member being mounted in the ball bearing cage. The central parallel slide member 110 is firmly attached at its forward end to a further ball guide which extends at right angles to parallel slide members. The outer slide members 110 are attached to the further ball guide by stays 116. The further ball guide also consists of a length of sliding door angle iron 118 having interiorly thereof a ball cage 120 in which is engaged a slide member 122. To this further ball guide is secured one end of the piston rod of the first ram. It will be seen that the outer parallel slide members 110 are connected by the stays 116 to the angle iron 118 of the transverse further ball guide.

A second ram 124 which comprises a double acting hydraulic cylinder 126 and a piston 128 carried on a rod 130 which extends through and beyond opposite ends of the cylinder has its cylinder parallel with and rigidly secured to the further ball guide angle iron 118 whilst its piston rod is secured at one end thereof by members 129 and 131 to the slide member 122 slidable in the ball cage 120 of the further ball guide. To this slide member 122 is secured a carriage 132 to which is releasably attachable a stitching template 134. The carriage consists of two parallel U-shaped arms 136 each disposed in a vertical plane with the bight portion 135 of the arm forwardly disposed and with the lower limb 137 of the arm rigidly connected at its rear end by a bracket 138 to the slide member 122. The upper limb 139 of each U-shaped arm is disposed above the level of the table top and at its rear end is secured to a bar element 140 which extends parallel with the second ram 124. On the bar element 140 is rotatably mounted a rod 142 which extends parallel to the bar and in the centre of which is secured an arm 144 by means of which the rod can be rotated. At each end of the rod is a finger 146 which engages a rear upright face of a block 148 secured to the top face of the stitching template at the forward edge thereof. The rod is biassed by a spring 150 to a position in which the fingers are urged into engagement with the stitching template. Disengagement of the template from the fingers is effected by appropriate downward pivotal movement of the arm 144.

It will be apparent that the first ram 100 effects fore and aft movement of the second ram 124 together with the carriage 132, the limits of such movement being determined by the length of the limbs of the U-shaped carriage arms 136. Side to side movement of the carriage is effected by the second ram 124 and thus operation of one or other or both rams can provide movement of the carriage 132 within its limits of movement in any direction in a plane parallel with the plane of the table top 6.

Figure 7:
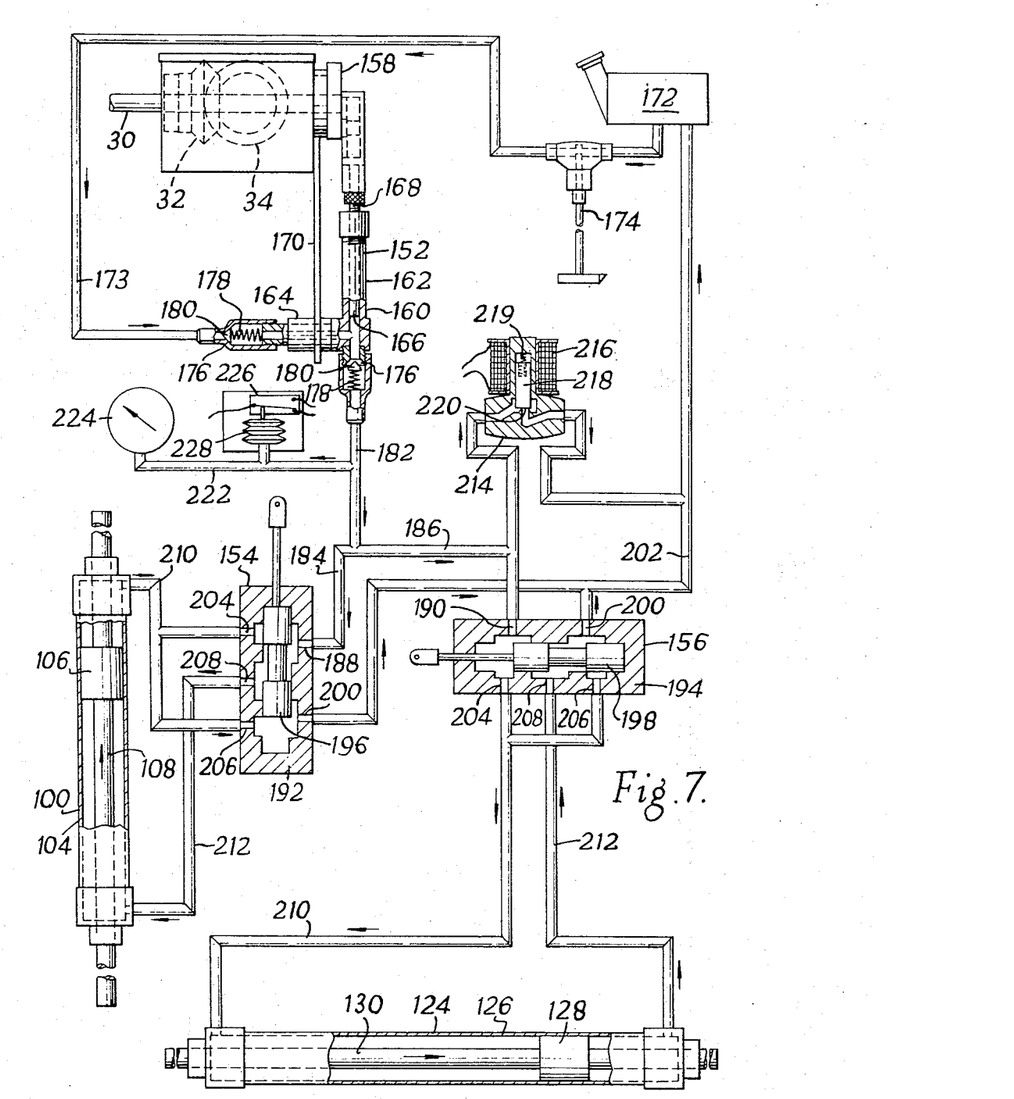
FIGURE 7 is a schematic view of the hydraulic system of the machine.

The first and second rams are supplied with hydraulic fluid from a reciprocatory pump 152 by way of respective solenoid operated spool valves 154 and 156. The reciprocatory pump 152 is driven from a crank or eccentric 158 secured to the end of the third shaft 30 remote from the cam 84 and cam follower 93, the length of the crank arm controlling the stroke of the pump. The pump consists of a hollow body 160 having two legs 162 and 164 disposed at right angles in one of which, namely leg 162, is a piston 166 to which is attached a piston rod 168 which projects from the leg and is pivoted to the crank 158 on the end of the third shaft 30. The leg 164 of the pump body opens into the leg 162 containing the piston 166 intermediate the ends of that leg. The pump is supported rigidly relative to the gear box 36 at the corresponding end of the shaft 30 by a mounting 170. The leg 164 of the pump body 160 communicates with an hydraulic fluid reservoir 172 by way of a duct 173 in which is an oil metering valve 174. This valve 174 is adjusted from the front panel of the machine and controls the speed of the template and, therefore, the stitch length of the sewn path. In each leg of the pump body 160 is formed a frustoconical valve seat 176 into engagement with which is urged by means of a spring 178 a nylon conical valve closure member 180. The arrangement is such that as the piston rod is drawn out of its containing hollow leg 162, i.e. the suction stroke of the piston rod hydraulic fluid is drawn from the reservoir 172 into the hollow body 160 by way of duct 173 whilst on the working or pressure stroke of the piston rod an outflow is caused from the pump body 160 through outlet duct 182 of hydraulic fluid under pressure. On the suction stroke member 180 in leg 164 is disengaged from its seating whilst member 180 in leg 162 is engaged on its seating. On the pressure stroke member 180 in leg 162 is disengaged from its seating and member 180 in leg 164 is engaged on its seating.

The outlet duct 182 of the pump body divides into two ram supply branches 184 and 186 which lead to respective ports 188 and 190 in the bodies 192 and 194 of solenoid operative spool valves 154 and 156 which have spring biassed spools 196 and 198. The two spool valves 154 and 156 which are solenoid actuated each have their valve bodies formed with, in addition to inlet ports 188 and 190 referred to above, an outlet port 200 which connects permanently with an exhaust branch 202 leading to the reservoir 172. Of three remaining ports 204, 206, 208 in each spool valve body, ports 204 and 206 are interconnected and lead by way of a duct 210 to one end of the associated first or second ram cylinder and the remaining port 208 leads by way of a duct 212 to the opposite end of the relevant ram cylinder. The spool of each valve is so shaped that when the associated solenoid is de-energised and the spool is positioned by its biassing spring (not shown) the supply branch 184 or 186 connects by way of inlet port 188 or 190 with one of the interconnected ports 204 and 206, the other interconnected port being blocked by the associated spool, whilst the port 208 connects with the exhaust branch 202 by way of the outlet port 200. When the solenoid is energised the port 208 of each spool valve body is connected with the inlet port 188 or 190 as the case may be whilst the port 206 connects with outlet port 200 and the port 204 is blocked by the spool. It will be appreciated that the interconnected port which is blocked during energisation of the solenoid is open during de-energisation thereof and vice-versa. Thus in one setting of each spool valve fluid is supplied to one end of the associated ram cylinder and in the other setting fluid is supplied to the opposite end of that cylinder.

Connected between the supply branch 186 and the exhaust branch 202 is a solenoid-operated pressure release valve 214 having a solenoid 216 and spring loaded plunger 218 one end of which within a body portion of the valve is formed with a closure member biassed by the plunger spring 219 into engagement with a complementary valve seat 220 formed in the body portion. The end of the plunger remote from the closure member projects from the body portion and forms the solenoid armature whereby the plunger can be withdrawn against the action of its biassing spring to connect the supply and exhaust branches 186 and 202 and thereby permit manual movement of the template carriage. The outlet duct 182 from the pump body 160 connects with a branch 222 in which is a pressure gauge 224 and a fluid pressure actuated micro-switch 226 operated by movement of a bellows 228. It will be understood that should the pressure from the pump in the supply branches exceed a predetermined value, the pressure actuated micro-switch 226 will operate to energise solenoid 216 of the release valve 214 which will thereby open to connect the supply and exhaust branches The preferred form of stitching template 134 which is utilised with the apparatus comprises two elongated similarly sized flat sheets 230 and 232 of substantially rigid plastics material, of which the lower sheet 230 is formed from laminated plastics material whilst the upper sheet is formed from transparent plastics material. The sheets are each formed with two elongated slots, i.e. slots 234 in the upper sheet and slots 236 in the lower sheet, conforming to the peripheral shape of two similar shirt collars the slots 236 in the lower sheet being somewhat narrower than the corresponding slots 234 in the upper sheet. In the flatwise superposed position of the sheets, each slot 234 overlies one of the slots 236 and the axes of the superposed slots are in register.

For providing improved frictional gripping of the fabric plies placed between the sheets, the inner surface of the upper sheet 232 has secured thereto lining pads 238 which are disposed, in the superposed position of the sheets, over apertures 240 in lining sheets 242 secured to the lower sheet 230. Further gripping pads 244 are secured to the inner surface of the upper sheet outwardly of the lining sheets 242 on the lower sheet. The pads and lining sheets may comprise, for example, glass paper or foam plastics material.

When the upper and lower sheets which are hinged together by a fabric hinge 244, are brought together with sets of fabric plies therebetween, the plies of each set are firmly secured by slight stretching therof between the associated lining sheet and its pads against any tendency to be dragged under the influence of the sewing machine needle 16. Moreover, as the width of the slot in the lower sheet is only sufficient to allow the free passage of the sewing needle, the tendency of the sewing needle to drag the fabric plies laterally with respect to the slots in the upper and lower sheets is substantially avoided.

Releasable means are provided for locating the sheets together in the superposed position thereof. To this end, there are provided on the upper surface of the lower sheet 230 adjacent the end edges thereof upstanding projections 246 which engage in complementarily shaped recesses 248 formed in the end edges of the upper sheet 232. Further upstanding projections 250 on the lower sheet 230 engage in apertures 252 in the upper sheet 232 in the superposed position of the sheets.

Figures 1, 8, 9:
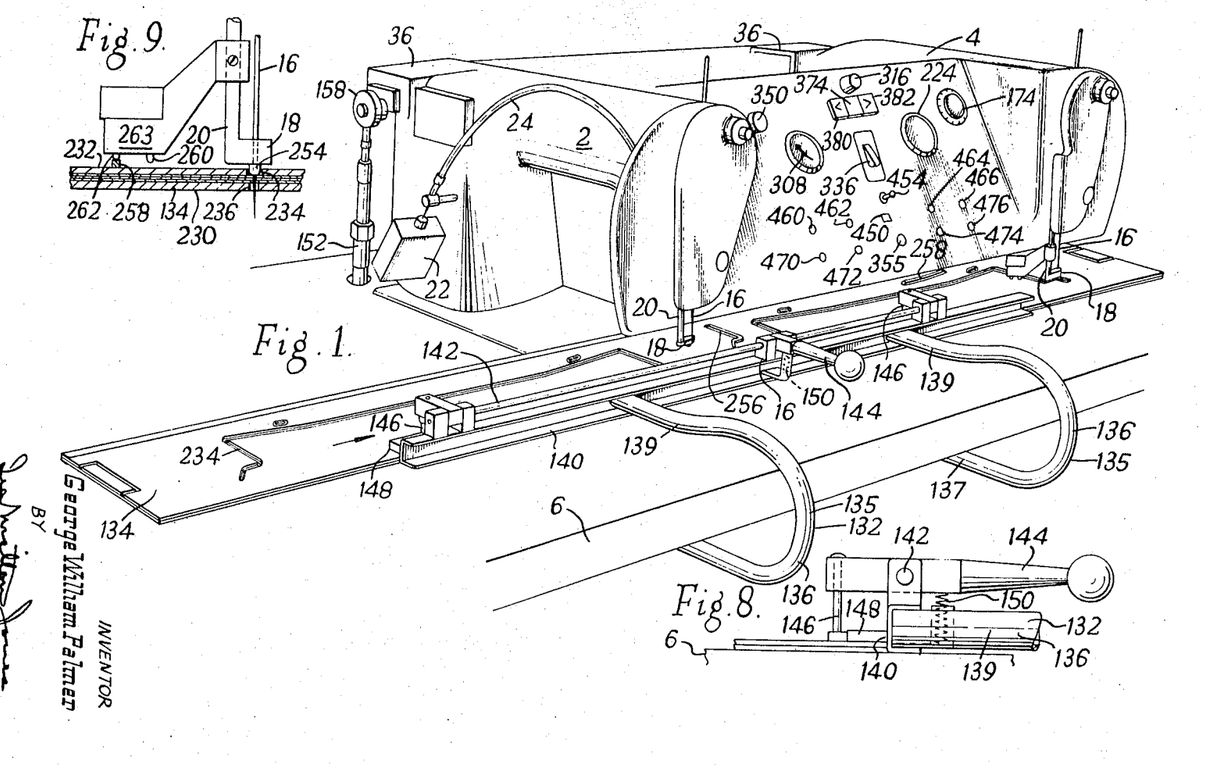
FIGURE 1 is a perspective view of a twin headed sewing machine employing a workholder according to the invention.
FIGURE 8 is a view as seen looking from the left of FIGURE 1 illustrating a detail.
FIGURE 9 illustrates a further detail showing how the stitching template is engaged by the sewing needle.
Figure 2:
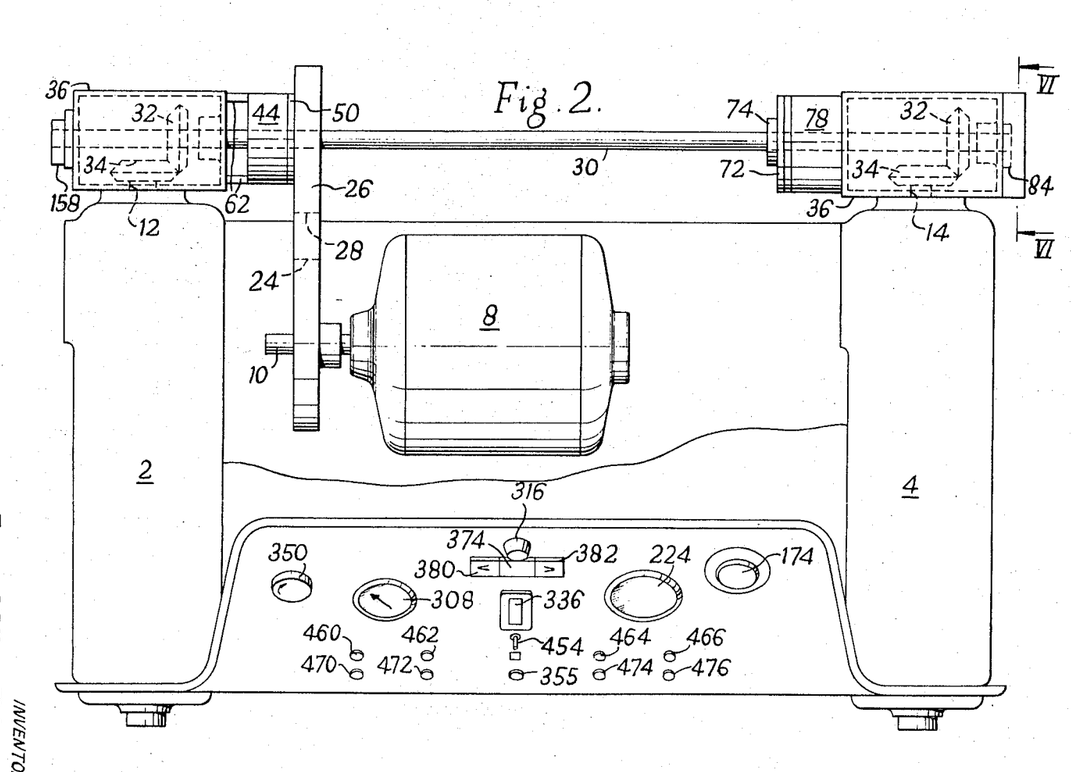
FIGURE 2 is a plan view of the machine of FIGURE 1.

Each sewing machine presser foot 18 has on a lower surface a projection 254 which during operation engages within the corresponding slot 234 in the upper sheet 232 of the template and through which a sewing needle reciprocates. It will be appreciated that the needle hole in the presser foot extends axially through both the presser foot and the projection 254 on the lower face thereof.

On the upper sheet of the stitching template are mounted as mentioned above, blocks 148 which the fingers 146 on the rod 142 of the carriage 132 engage when the template 134 is releasably secured to the carriage. It will be seen that the sheets of the template in their forward edges are formed with a recess 255 which, when the template is mounted on the carriage, fits around a projection 253 on the bar element 140. This projection and recess 255 serve as pre-locating means for the template on the carriage.

Near the end of one of the slots 234 in the upper sheet and adjacent an intermediate part of that slot are mounted raised elements which comprise brass strips 256 and 258 which cooperate with remote control elements 260 and 262 mounted on the corresponding presser foot rod 20 for actuating respective microswitches 264 and 266 which control the energisation of the solenoids of the spool valves. The raised strip 258 has a ramp 268 at the beginning and end thereof leading down to the upper surface of the upper sheet whilst the strip 256 has a ramp 270 only at one end thereof. The remote control elements 260 and 262 are carried in and project downwardly from a housing 263 secured to one of the presser foot rods 20 and are of the form of the familiar camera shutter release mechanism, i.e. a Bowden wire in which the wire at opposite ends terminates in plungers and the wire and plungers are springs biased in a particular sense. In the normal position of the plungers projecting from the housing, the solenoids of the spool valves 154 and 156 are energised but when either or both plungers are engaged on the respective strip elements 256 and 258, the associated solenoid or solenoids are de-energised to reverse the supply of hydraulic fluid to one or both the associated hydraulic rams 100 and 124.

As seen in plan view and looking from the front side of the table, the stitching template is required to make successively from its extreme left hand position the following five movements in order to move the slots fully from beginning to end thereof relative to the sewing needles: viz.

(1) A movement forwards and to the right to define the outline of a collar tab;

(2) A movement forwards to define one end edge of the cape portion of the collar;

(3) A movement generally to the right which includes small movements rearwards and forwards, for the purpose of defining the free outer edge of the collar cape portion.

It should be noted that at the beginning of this movement the template has to change from forward to rearward movement and this requires reversal of the supply to the ram 100.

(4) A movement to the rear to define the other end edge of the cape portion of the collar, this movement requiring to be preceded by supply reversal to the ram 100 and (5) A movement to the rear and to the right, this movement defining the other tab of the collar.

Figure 11:
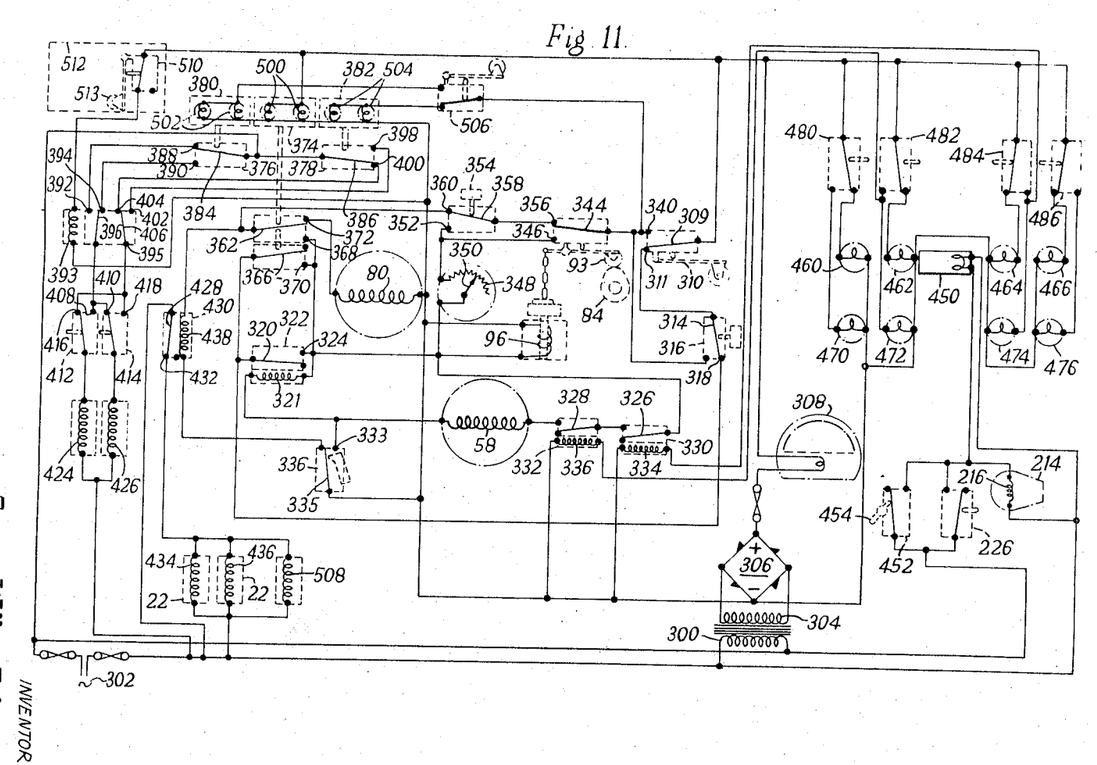
FIGURE 11 is a diagram illustrating the electrical circuit of the machine.

Before the full operation can be appreciated a description of the electrical lay-out is required and this will now be set forth with reference to FIGURE 11.

A transformer primary winding 300 is supplied from an alternating supply, suitably 250 volts at 50 cycles per second. A secondary winding 304 of the transformer is connected to the input of a full wave rectifier 306 to the output of which is connected, by way of an ammeter 308 mounted on the front panel of the machine, the movable contact 309 of the main two-position microswitch 310 drawing a unidirectionally operated follower 313 which is carried on the underside of the table of the machine and is actuated by a plate 312 on one of the slide members 110 at the commencement and end of the sewing track on forward movement of the carriage. One of the fixed contacts, namely, contact 311, of the main microswitch is connected to a movable contact 314 of an emergency two-position microswitch 316 one of the fixed contacts 318 of which connects with the movable contact 320 of a locking relay 322 including a locking coil 321. One of the fixed contacts 324 of the locking relay 322 connects with common ends of the relay coil 321, the solenoid 96 which when energised holds the cam follower 93 out of contact with the cam 84 on the third shaft 30, and the clutch coil 58 by way of movable members 326 and 328 of relays 330 and 332 having respective relay coils 334 and 336. The contacts of relays 330 and 332 are shown in the positions which obtain when the presser feet are raised. On lowering of the presser feet the contacts of relays 330 and 332 complete the series path to the clutch coil 58. The other ends of the locking relay coil 321 and the clutch coil are returned to the output of the full wave rectifier by way of a fixed contact 333 and a movable contact 335 of a presser foot lift switch 336 on the front panel of the machine whilst the other end of the solenoid 96 is directly returned to the output of the rectifier 306.

The other fixed contacts 340 and 342 of the main and emergency micro-switches are connected together and to the movable contact 344 of the microswitch 90, hereinafter called the cam microswitch which is actuated, when the cam follower 93 engages the cam on the third shaft, once per revolution of that shaft. A fixed contact 346 of the cam microswitch 90 connects with the resistor 348 of a variable resistor carried on the front panel of the machine and having its slide wire 350 connected to the common point of the cam solenoid 96, the relay coil 321, and, by way of relays 332 and 334, the clutch coil 58. To this same fixed contact 346 of the cam microswitch is connected a fixed contact 352 of a "low speed" microswitch 354 whilst to the other fixed contact 356 of the cam microswitch is connected the movable contact 358 of the "low speed" microswitch. The remaining fixed contact 360 of the "low speed" microswitch is connected to a first movable member 362 of a double or "start" microswitch 364 having a further movable member 366. The movable member 366 of the "start" microswitch is connected to the movable member 320 of the locking relay 322. Fixed contacts 368 and 370 associated respectively with the movable members of the start microswitch are connected together and to the fixed contact 324 of the locking relay which is connected via relays 330 and 332 with the clutch coil 58, the cam solenoid 96 and the locking relay coil 321. The remaining fixed contact 372 associated with the movable member 362 of the "start" microswitch is connected to one end of the brake coil 80 the other end of which is returned to the output of the full wave rectifier 306.

The movable members 362 and 366 of the "start" microswitch are moved in unison by a push button 374 of a start switch on the front panel of the machine. This start switch is flanked on both sides by respective direction selecting microswitches 376 and 378 the circuit of which is hereinafter fully described. The direction selecting switches are operated by push buttons 380 and 382 and are interlocked so that if one is depressed the other is retracted and vice versa.

The movable elements 384 and 386 of the two direction selecting microswitches are connected together and to the positive side of the mains supply. The direction selecting microswitch 376 has its fixed contacts 388 and 390 connected to respective fixed contacts 392 and 394 of a direction controlling relay 395 associated with which fixed contacts is a movable contact 396. Likewise the fixed contacts 398 and 400 of microswitch 378 are connected to further fixed contacts 402 and 404 of the relay 395, these being associated with contacts 402 and 404 and movable contact 406. The movable contact 396 is connected to fixed contacts 408 and 410 of direction sensing microswitches 412 and 414 which are remotely actuated respectively by the elements 252 and 260. The remaining fixed contacts 416 and 418 of microswitches 412 and 414 are connected to movable contact 406 of the relay 395. Movable contacts 420 and 422 of the microswitches 412 and 414 actuated by the remote control elements 262 and 260 are connected to the solenoids 424 and 426 of the valves 154 and 156, the ends of these solenoids remote from the remotely controlled microswitches 412 and 414 being connected together and to the negative side of the supply.

Also connected to the positive side of the supply is a movable member 428 of a relay 430 which has a fixed contact 432 connected to one end of parallel connected presser foot actuating solenoid coils 434 and 436 the other end of these being connected to the negative side of the supply. The coil 438 of relay 430 is connected to the movable contact 362 of the start microswitch and the fixed contact 337 of the switch 335.

The general operation of the machine can now be appreciated and will now be described. After the description of the operation there will further be described certain refinements and preferred forms of the electrical circuits.

First it will be assumed that the carriage is at the left hand end of its travel and that a stitching template with fabric plies therein is secured relative to the bar 140 of the carriage by the fingers 146 on the rod 142 mounted on the bar. The presser feet 18 of the two machine heads are lowered by operation of switch 336 to close contacts 333 and 335 and are engaged at the right hand ends of their respective tracks in the template 134 and are urged downwards towards the template by the biassing springs (not shown) operating on rods 20, the presser feet actuating solenoids being in a de-energised state and the relays 326 and 328 being electrically closed by the lowering of the presser feet to place the clutch coil 58 in parallel with coil 321. The direction selection switches 376 and 378 are set by depressing push button 382 so that the switch 378 controlling movement to the left is depressed thus maintaining the other direction selecting switch in the retracted position. The start button 374 is then depressed and this closes, so long as pressure is maintained on the start button, the double or "start" microswitch 364. Prior to pressing of the start button the brake coil 80 was energised by reason of its being in series with microswitches 310, 90 and 354 and immediately on pressing of the start button the brake coil is de-energised and the locking relay coil 321 is energised by being connected across the rectifier output by way of these same microswitches 310, 90 and 354 and the double microswitch 364. Energisation of the locking relay coil 321 is accompanied by energisation both of the clutch coil 58 and the cam solenoid 96. The carriage thus begins to move forwardly and the cam follower 93 is held out of contact with the cam 84. Energisation of the locking relay coil 321 also closes contacts 320 and 324 of the locking relay which means that the clutch coil 58 and cam solenoid 90 are energised, since the carriage has moved forwardly and thereby actuated the main microswitch 310, by a circuit connected across the rectified output of rectifier 306 and including the main microswitch 310, the emergency microswitch 316 and the locking relay contacts. The start button 374 can thus be and is released as the locking relay coil 321 remains energised by the fact of closure of the locking relay contacts.

The movement No. 1 specified above therefore proceeds because the clutch is energised and in consequence, pump 152 operates and also, a circuit is completed across the supply by way of contacts 386, 400, 404, 406, 416, 420 and solenoid 424. At the end of the first movement the motion to the right of the template 134 is brought to a halt because the engagement of the projection 254 on the presser foot in the front to rear section of the sewing track defining the right hand end of the cape portion of the collars prevents any lateral movement of the piston 128 of the ram 124 and, therefore, the whole of the fluid output of the pump is delivered to the ram 100. As during the first movement the ram 100 is set for forwards movement of the template 134 no reversal of ram 100 is required to enable the second movement to proceed and this, accordingly, commences. Near the end of this second movement the spring loaded plunger element 262 mounts ramp 268 of the raised element 258 on the upper sheet of the template 134 and causes actuation of the microswitch 412 in consequence of which solenoid 424 is de-energised and the supply to the ram 100 is reversed, whereupon the third of the movements of the stitching template commences. The element 258 which has been mounted in order to commence the third movement of the template extends parallel with part of the portion of the sewing track defining the free outer edge of the cape portion of the collar. During this third movement the front to rear movement of the template is small. This means that the fluid supplied to the ram 100 is very small compared with that supplied to ram 124 and, accordingly, the setting of this ram during the third movement is not critical to the operation. It is for this reason that it is only necessary to switch the supply to the ram 100 at the beginning of the third movement of the template and that the switching back of the supply to the ram 100 as the element 262 drops off the raised element 258 does not affect the operation.

Towards the end of the third movement the plunger element 262 engages the ramp 270 of the raised strip element 256 on the template and causes actuation of the microswitch 412 associated with that plunger and this causes reversal of the fluid supply to the first ram 100. This ram thus moves the template to the rear to complete the fourth and then the fifth movement of the template, the fifth movement requiring no change in the ram setting from that obtained during the fourth movement.

It will be noted that to complete the movements of the template no change in the setting of the valve supplying the ram 124 was required. However, in order to sew different outlines, e.g. a collar in which the end edges of the cape extend outwards and rearwards from the collar tabs, it is necessary to provide the facility for reversing the supply to the ram 124 at any point between the ends of the sewing track. This facility is afforded by element 260 and microswitch 414, the element 260 cooperating with further strips similar to strips 256 and 258 to effect actuation of microswitch 414 and therefore resetting of the valve supplying ram 124.

At the end of the fifth movement of the template the plate 312 engages and actuates the main microswitch 310. This causes deenergisation both of the clutch coil 58 and the solenoid 96 in parallel with the clutch coil. The cam follower 93 associated with this solenoid then drops into contact with the cam on the end of the third shaft 30 and at an appropriate position of this cam connection is made through the low speed microswitch 354 and the microswitch 90 to the brake and thereby a braking effect is applied to the sewing needles.

When the machine is stopped by energisation of the brake coil the push button 355 on the front panel of the machine of the low speed microswitch 354 can be depressed to cause de-energisation of the brake coil and energisation of the clutch coil in series with the variable resistor 348, i.e. under reduced power. Thus, whilst this push button is depressed the needle will reciprocate slowly and this movement can be utilised to pick up the bobbin thread should the thread for any reason have previously been broken.

When the end of the sewing track is reached, should the sewing needle overshoot the uppermost position thereof as the brake is applied, the microswitch 90 associated with the cam on the end of the needle drive shaft will be repositioned to put the clutch in series with the variable resistor 348 across the full wave rectifier and the machine is driven under reduced power until the cam actuated microswitch is operated once again to energise the brake coil and de-energise the clutch coil.

It will be apparent that after completing the five sewing movements described above, the direction selection switches can be repositioned, a fresh template inserted in the carriage and the operation carried out once again in reverse.

It will be apparent that as the pump draws fluid from the reservoir by way of a metering valve, the adjustment of the metering valve varies the speed and therefore the stitch length of the overall operation. It will also be apparent that the engagement of the projection 254 with the sides of the slot 234 controls the distribution between the rams 100 and 124 of the fluid supply from the pump.

It will be appreciated that as the relay coil 438 is connected across the brake, depressing the push switch 336 to energise the solenoids which lift the presser feet is ineffective unless the brake is energised. This is necessary since on lifting the presser feet during sewing the template would otherwise continue moving along its line of movement prior to lifting of the presser feet and the sewing needles would thus be damaged and would damage the template.

Additional and optional circuits of the electrical system will now be described. First there is provided across the source of supply a circuit consisting of the fluid pressure actuated microswitch 226 and the solenoid 216 of the hydraulic fluid by-pass valve 214. When the hydraulic pressure at the pump outlet exceeds a predetermined value the fluid pressure actuated microswitch 226 operates to energise the solenoid of the by-pass valve which thereby opens to relieve pressure in the hydraulic system by connecting the pump outlet to the reservoir. In parallel with the solenoid 216 is a neon lamp 450 which therefore is illuminated when the by-pass valve 214 is open. Also, in parallel with the microswitch 226 is a microswitch 452 operated by a toggle 454. Operation of the microswitch 452 by the toggle 454 completes the circuit of the by-pass solenoid valve which is thus opened and enables the carriage to be moved by hand. The neon lamp 450 and toggle 454 are mounted on the front panel of the machine. Also carried on the front panel of the machine are four pairs of red and green lamps of which the red lamps 460, 462, 464 and 466 are arranged in a row above the green lamps 470, 472, 474 and 476 there being a red lamp above each green lamp. Each of the four pairs of red and green lamps are connected in relation to the output of the full wave rectifier 306 in the following manner. At one side thereof the pair of lamps are connected together and to the negative side of the rectifier output. At the other side thereof, each lamp is connected to a separate fixed contact of a microswitch the movable contact of which is connected to the positive side of the rectifier output. The microswitches associated with the pairs of lamps are designated 480, 482, 484, and 486.

The microswitches 480 and 486 associated with the outermost pairs of lamps are mounted on the bar 140 of the carriage near opposite ends thereof and actuated when a template is fitted to the bar. Before actuation of these microswitches the red lamp bulbs associated therewith are illuminated and after actuation of the microswitches the green lamp bulbs are illuminated. The microswitches 482 and 484 of the pairs of lamps flanking the neon lamp 450 are actuated by movement of the presser feet. In the raised position of each of the latter the red lamp is illuminated and in the lower position the green lamp is illuminated. It will be evident that when the machine operator sees a row of green lights he knows he can safely commence sewing. However, if he sees a red lamp illuminated he can immediately identify the source of the trouble and remedy it.

It will be noted that when the microswitches 482, and 484 are positioned to illuminate the associated green lamps the relay coils 332 and 334 are energised and hold their associated contacts closed to keep the series path to the clutch coil firmly closed.

A further lighting circuit is provided for providing illumination of the start push button 374 and the push buttons 380 and 382 of the direction selection switches. To this end the positive side of the output of the full wave rectifier 306 is connected to one side of lamps 500 in the start push button and the opposite side of the lamps 500 is returned to the negative side of the rectifier output. Lamps 502 and 504 in push buttons 380 and 382 are each connected at one side to the negative side of the rectifier output and at the other side to respective fixed contacts of a microswitch 506 whose movable contact 508 is connected to the fixed contact 340 of the main microswitch 310. The microswitch 506 is mounted on the cylinder of the ram 124 and actuated by a guide element 508 secured to the piston rod 120. The element 508 engages the microswitch 506 over the right hand half of the travel of the carriage. It will be apparent that as the movable member of microswitch 506 is connected to fixed contact 340 of the main microswitch the lamps 502 and 504 are only illuminated when the brake is energised. It will be seen that when the carriage is at the right hand end of its travel and the brake is applied lamps 502 are illuminated to indicate that the next movement to take place of the carriage should be to the left. Similarly, lamps 504 are illuminated at the left hand end of the travel of the carriage when the brake is applied.

If desired, a bottom thread cutter device can be provided. This comprises a pair of co-operating knives movement of which is effected by a solenoid 508. This solenoid is parallel connected with the foot lift solenoids 434 and 436 so that the bottom thread cutters operate upon raising of the presser feet, and accordingly this cannot take place unless the brake coil is energised.

Figures 12, 13:
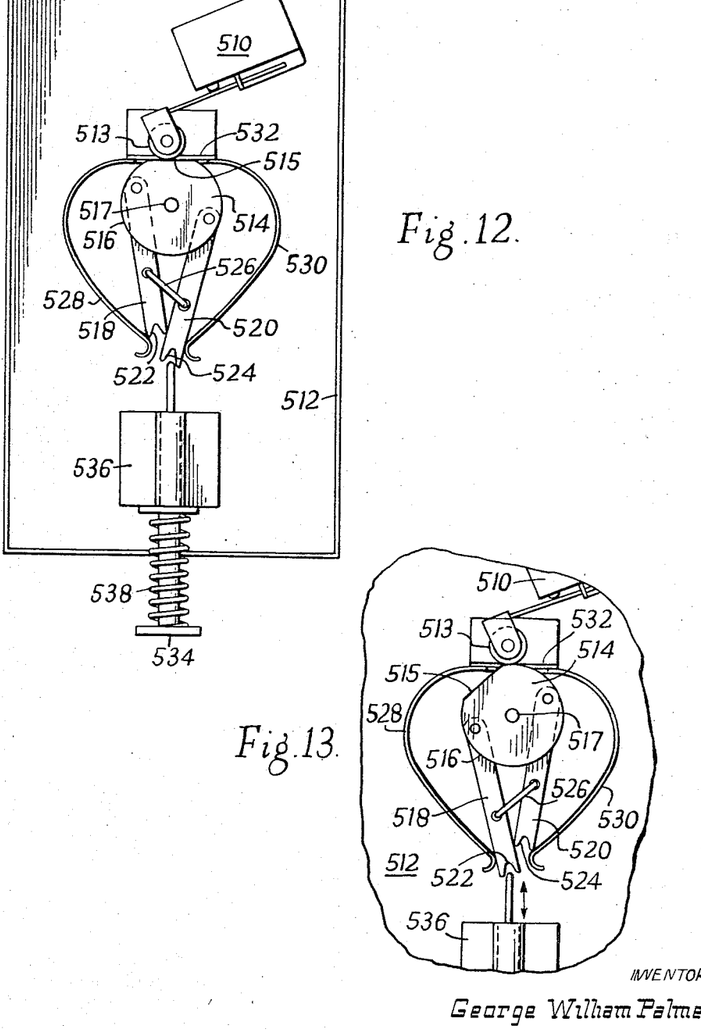
FIGURES 12 and 13 are views in different set positions of an optional backtacking device which can be employed on the machine.

As a preferred feature the machine described may be provided with electrical and mechanical means whereby backtacking, i.e. double stitching at the ends of the sewing tracks can be effected. To this end a coil 393 of relay 395 is connected in series with a microswitch 510 across the output of rectifier 306. The mechanical means of the backtacking system comprise a box 512 carried underneath the machine table in which is contained the microswitch 510.

The follower roller 513 of the microswitch 510 engages a cam 514 including a straight edge 515 and a part circular edge 516, the cam being rotatable about axis 517 at the centre of the circle defined by the edge 516. Pivoted on the cam are arms 518 and 520 formed at their extremities remote from the cam with respective notches 522 and 524 and loosely connected together by a link 526. Leaf springs 528 and 530 secured at corresponding ends thereof to an abutment 532 bias the arms 518 and 520 one towards the other. A plunger 534 carried in a support 536 is biased by a spring 538 away from the arms 528 and 530. The plunger 534 is depressed by an abutment 536 carried on the same slide member 110 as the plate 312 only after the plate 312 has moved rearwardly past the follower 313 during which movement the main microswitch 310 is not actuated. Each time the plunger 534 is depressed the microswitch 510 is actuated and held in its actuated position by reason of the movement of the roller from the edge 515 to the edge 516 or vice-versa.

In operation, at the commencement of sewing, the sewing needles are disposed a short distance, say about ¾ of an inch, from the end of the sewing track. As sewing begins on depression of the start button 374 the carriage moves to the rear solenoid 424 being energised and solenoid 426 being de-energised and at the end of the sewing track the microswitch 510 is operated and the relay coil 393 is de-energised with the result that contacts 296 and 406 of the relay 395 are made to change over and engage contacts 392 and 402 and thus has the effect of energising solenoid 426 and de-energising solenoid 424 so that the carriage movement is reversed. The start button 374 is held depressed until on the reverse carriage movement the plate 312 passes the roller 313. The start button is then released and sewing proceeds to the other end of the sewing track in the manner described above. As the end of the track is approached, the plate 312 moves past the roller 313 without operating the microswitch 310. The microswitch 510 is then operated and reverses the carriage movement which is then arrested as the plate 312 actuates the main microswitch 310.

It will be apparent that in the embodiment described above, further sewing machine heads could be operated from the third shaft 30.

Figures 6, 14:
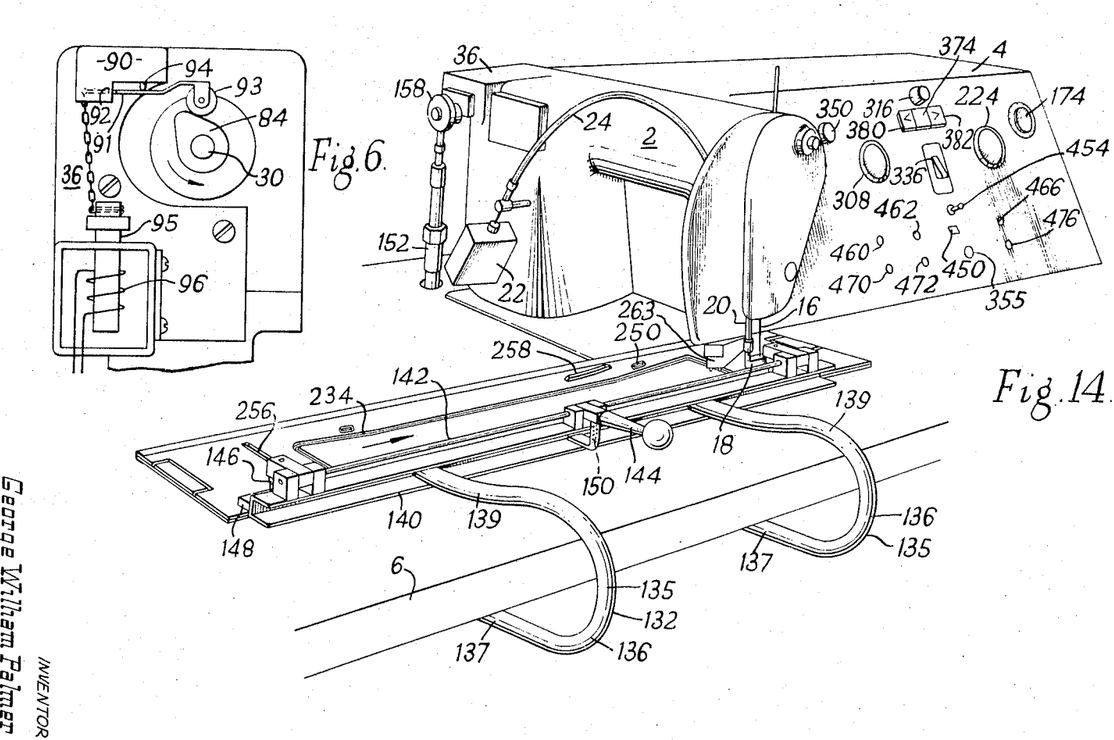
FIGURE 6 is a view taken on the line VI—VI of FIGURE 2.
FIGURE 14 is a perspective view of a single head sewing machine employing a workholder according to the invention.
Figure 15:
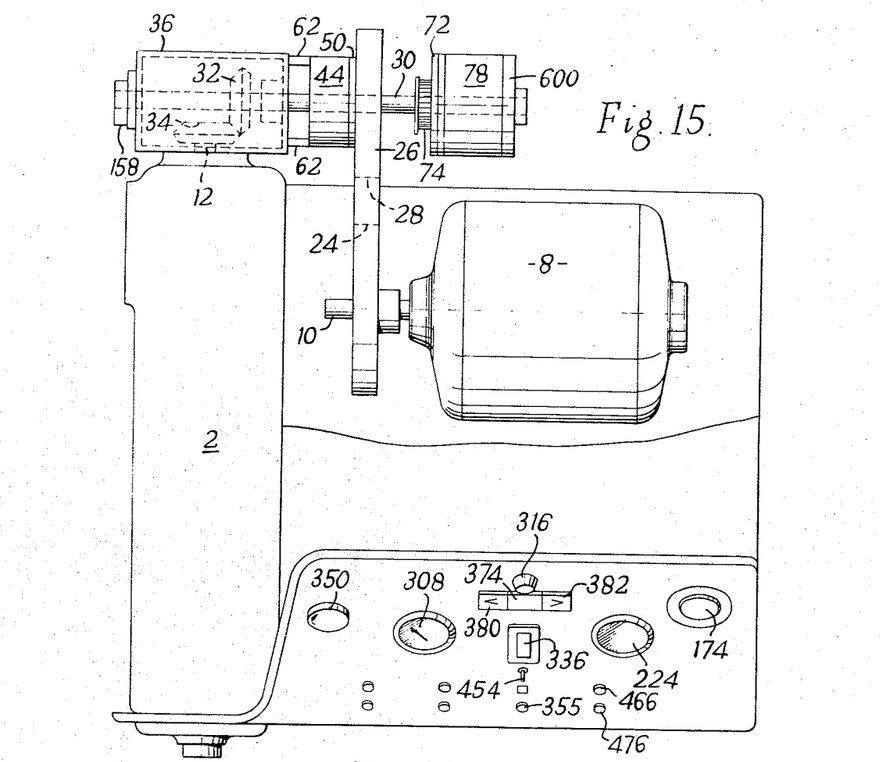
FIGURE 15 is a plan view of the machine of FIGURE 14.
Figure 16:
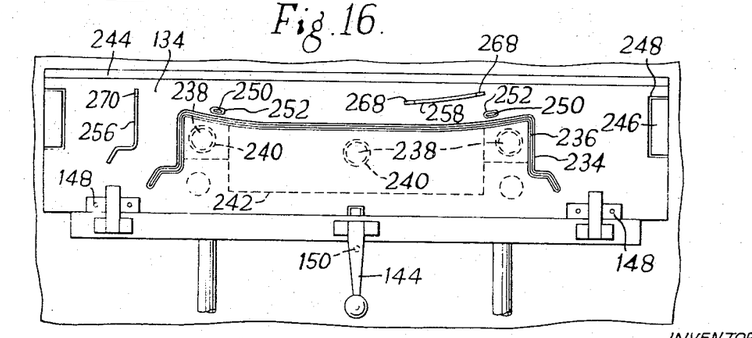
FIGURE 16 is a plan view of the workholder used with the machine of FIGURES 14 and 15.

Referring now to FIGURES 14, 15 and 16 which depict an alternative embodiment of the invention, the sewing machine therein illustrated is a single head machine and operates with a stitching template having a single sewing track, the template being symmetrically disposed with respect to the carriage 132 and being provided, as before, with upstanding strips 256 and 258 which co-operate with the remote control elements 260 and 262.

It will be seen, however, that the brake housing requires to be carried on a separate bracket 600 secured to the machine frame. The hydraulic circuit of the machine of this embodiment and the mechanical arrangements for effecting movement of the carriage are closely similar to those depicted, respectively in FIGURES 6 and 4. The electrical circuit of the machine of this embodiment is the same as that of FIGURE 10 save that only one of the foot lift solenoids 434 and 436 is required, only one of the relays 330 and 332 is required and only one of the microswitches 482 and 484 and its corresponding red and green lamps is required. The operation of this embodiment of the invention is the same as has been described above in relation to the embodiment depicted in FIGURES 1 to 12.

It will be understood that in the operation of both described embodiments of the invention, a template loaded with fabric plies is inserted at one side of the machine and removed after stitching from the other side of the machine. A further template is then inserted.

It will be apparent that in its broader aspects the invention can be applied to any seam forming machine and indeed to any machine for moving a template relative to a tool irrespective of whether it is the template or the tool that is actually moved.

I claim:
1. A workholder by which a seam can be stitched along a desired line through plies of fabric by means of a sewing machine in which the workholder is guided for motion in a plane below and normal to a sewing needle of the machine, and which machine has means for urging the workholder in opposite directions along each of a pair of coordinate axes in said plane, and a pair of switches mounted at fixed locations, a switch for each of the axes, each switch providing for control of the direction in which the workholder is urged for motion along its axis, said workholder comprising:
   (A) upper and lower plates of substantially rigid material between which plies of fabric are adapted to be flatwise confined, each of said plates having a slot defining a path along which said desired line of stitching is to be made;
   (B) cooperating means on the plates for holding them in superimposed relation with their slots in register; and
   (C) upstanding switch operating means fixed on the upper plate, located intermediate the ends of the slot therein and to one side of said slot and in such relation thereto that the appropriate switch is actuated by said means whenever change of direction of motion of the workholder along one of said axes is required to enable the sewing needle of the machine to follow the slot.

2. The workholder of claim 1, further characterized by:
   said switch operating means comprising elongated means extending parallel with its laterally adjacent portion of the slot.

3. The workholder of claim 1, further characterized by:
   the slot in the lower plate being narrower than the slot in the upper plate.

4. The workholder of claim 1, further characterized by:
   (A) a lining sheet on the surface of one plate that opposes the other, said lining sheet having apertures therein; and
   (B) lining pads on the opposing surface of the other plate, respectively receivable in said apertures in the lining sheet when the upper and lower plates are superimposed.

References Cited

UNITED STATES PATENTS

| | | | |
|---|---|---|---|
| 3,001,489 | 9/1961 | Bond et al. | 112—2 |
| 3,034,458 | 5/1962 | Bennison | 112—2 |
| 3,170,423 | 2/1965 | Henebry | 112—2 |
| 3,172,379 | 3/1965 | Light | 112—2 |

FOREIGN PATENTS 175,445  7/1953  Austria.

JORDAN FRANKLIN, *Primary Examiner.*

J. R. BOLER, *Assistant Examiner.*